United States Patent
Dabrowski et al.

(10) Patent No.: US 10,367,253 B2
(45) Date of Patent: Jul. 30, 2019

(54) WIDEBAND BOWTIE ANTENNA INCLUDING PASSIVE MIXER

(71) Applicant: THE BOEING COMPANY, Chicago, IL (US)

(72) Inventors: Ted Ronald Dabrowski, Madison, AL (US); Robert Alan Smith, Hampton Cove, AL (US)

(73) Assignee: The Boeing Company, Chicago, IL (US)

( * ) Notice: Subject to any disclaimer, the term of this patent is extended or adjusted under 35 U.S.C. 154(b) by 138 days.

(21) Appl. No.: 15/692,526

(22) Filed: Aug. 31, 2017

(65) Prior Publication Data

US 2019/0067804 A1    Feb. 28, 2019

(51) Int. Cl.
| | |
|---|---|
| *H01Q 1/28* | (2006.01) |
| *H01Q 9/28* | (2006.01) |
| *G06K 19/077* | (2006.01) |
| *H01Q 5/30* | (2015.01) |
| *H01Q 1/24* | (2006.01) |

(52) U.S. Cl.
CPC ......... *H01Q 1/28* (2013.01); *G06K 19/07775* (2013.01); *H01Q 1/247* (2013.01); *H01Q 5/30* (2015.01); *H01Q 9/28* (2013.01)

(58) Field of Classification Search
CPC ............ H01Q 1/28; H01Q 5/30; H01Q 1/247; H01Q 9/28
USPC ........................................................ 343/705
See application file for complete search history.

(56) References Cited

U.S. PATENT DOCUMENTS

| | | | |
|---|---|---|---|
| 6,950,076 B2 | 9/2005 | Holly | |
| 8,299,994 B2 | 10/2012 | Wang et al. | |
| 8,860,617 B1* | 10/2014 | Fenick | H01Q 7/00 343/729 |
| 2003/0128919 A1* | 7/2003 | Weiss | B82Y 20/00 385/25 |
| 2004/0232406 A1* | 11/2004 | Weiss | H02S 99/00 257/35 |
| 2015/0365043 A1* | 12/2015 | Sarabandi | H02S 10/30 257/461 |

(Continued)

OTHER PUBLICATIONS

Dabrowski et al., "Dominant H-Field Multiband Loop Antenna Including Passive Mixer," U.S. Appl. No. 15/344,525, filed 15/344,525, 42 pages.

*Primary Examiner* — Huedung X Mancuso
(74) *Attorney, Agent, or Firm* — Yee & Associates, P.C.

(57) ABSTRACT

A passive difference-frequency tag including a first antenna on a substrate, the first antenna having a first frequency band, the first antenna having a first shape of a first bowtie with first rounded end caps and first ends opposed to each other. The passive difference-frequency tag also includes a second antenna on the substrate inside the first antenna. The second antenna has a second frequency band higher than the first antenna frequency band. The second antenna having a second shape of a second bowtie with second rounded end caps and second ends opposed to each other. A combination of the first antenna and the second antenna forms a plurality of multi-band antennas with a shared axis of symmetry. The passive difference-frequency tag also includes a diode assembly on the substrate, and connected to the first ends of the first antenna and to the second ends of the second antenna.

20 Claims, 11 Drawing Sheets

(56) References Cited

U.S. PATENT DOCUMENTS

2016/0233371 A1\* 8/2016 Apostolos ............... H01L 31/09
2017/0365909 A1\* 12/2017 Wu .................. G06K 19/07786

\* cited by examiner

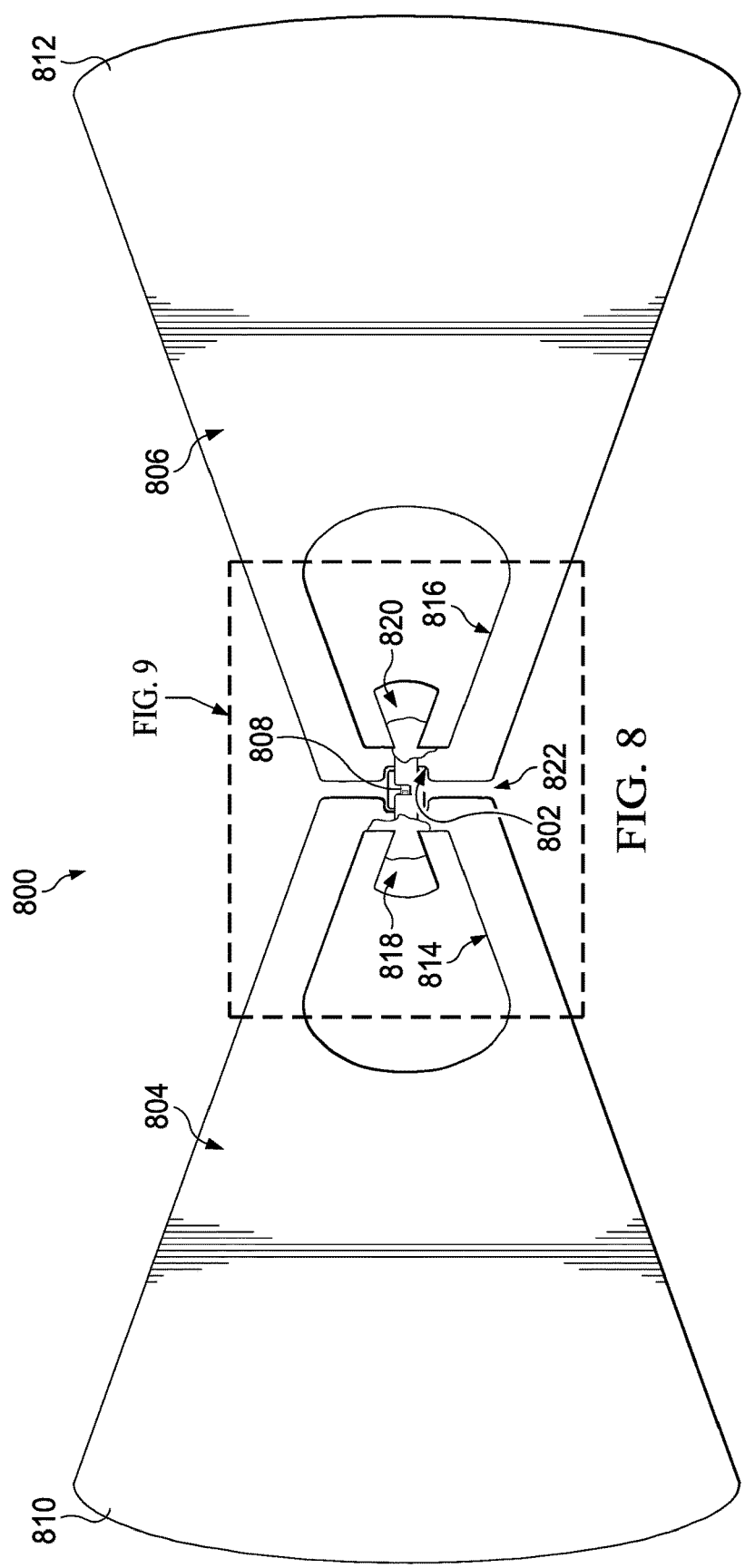

WIDEBAND BOWTIE ANTENNA INCLUDING PASSIVE MIXER

BACKGROUND INFORMATION

1. Field

The present disclosure relates to methods and devices for wideband bowtie antennas, including passive mixers, and in particular to nested wideband bowtie antennas including a diode passive mixer.

2. Background

Miniature passive antennas can be useful as tags placed on objects in order to make finding the objects easier. However, especially with metallic objects, radio interference can arise due to the electrically conductive nature of metals. Thus, miniature passive antennas can have limited or inhibited functionality when placed on or near metallic objects or other conductive objects.

SUMMARY

The illustrative embodiments provide for a method for a passive difference-frequency tag. The passive difference-frequency tag includes a first antenna on a substrate, the first antenna having a first frequency band, the first antenna having a first shape of a first bowtie with first rounded end caps and first ends opposed to each other. The passive difference-frequency tag also includes a second antenna on the substrate inside the first antenna. The second antenna has a second frequency band higher than the first antenna frequency band. The second antenna having a second shape of a second bowtie with second rounded end caps and second ends opposed to each other. A combination of the first antenna and the second antenna forms a plurality of multi-band antennas with a shared axis of symmetry. The passive difference-frequency tag also includes a diode assembly on the substrate, and connected to the first ends of the first antenna and to the second ends of the second antenna.

The illustrative embodiments also provide for a passive radio frequency antenna. The passive radio frequency antenna includes a first radio conductive material having a first frustoconical shape. A first base of the first frustoconical shape is rounded outwardly relative to a first apex of the first frustoconical shape. A first cut-out is removed from the first frustoconical shape nearer to the first apex than to the first base. The passive radio frequency antenna also includes a second radio conductive material having a second frustoconical shape. A second base of the second frustoconical shape is rounded outwardly relative to a second apex of the second frustoconical shape. A second cut-out is removed from the second frustoconical shape nearer to the second apex than to the second base. The first apex is proximate to but separated from the second apex such that the first radio conductive material and the second radio conductive material appear to have a bowtie shape. The passive radio frequency antenna also includes a third radio conductive material having a third frustoconical shape extending from the first apex into the first cutout towards the first base. The third base is rounded outwardly relative to the first apex. The passive radio frequency antenna also includes a fourth radio conductive material having a fourth frustoconical shape extending from the second apex into the second cutout towards the second base. The fourth base is rounded outwardly relative to the second apex. The passive radio frequency antenna also includes nonlinear device connecting the first radio conductive material and the second radio conductive material between the first base and the second base, and also connecting the third radio conductive material and the fourth radio conductive material between the third base and the fourth base.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of another nested bowtie antenna, in accordance with an illustrative embodiment;

DETAILED DESCRIPTION

Figure 1:
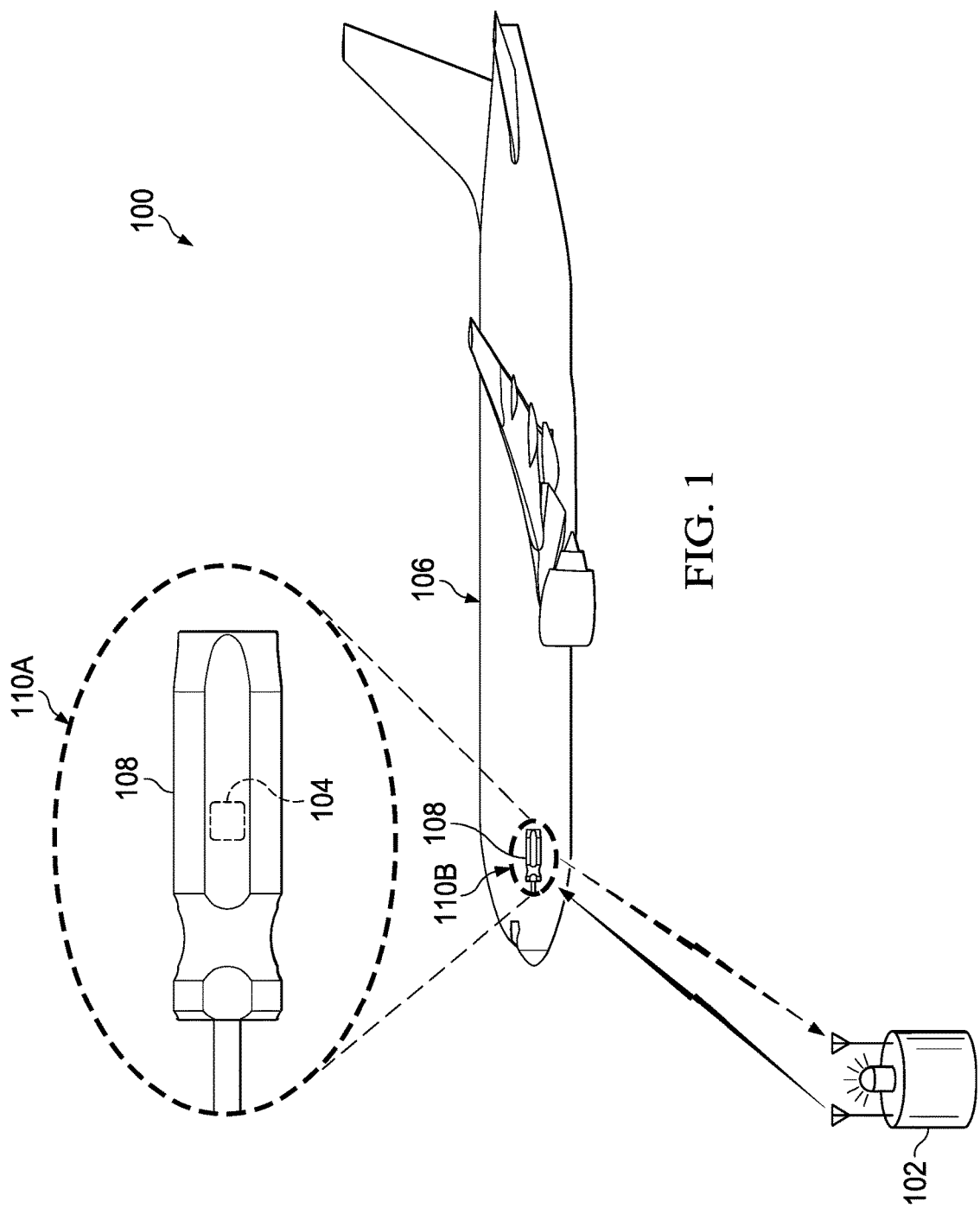
FIG. 1 is an illustration of a system for detecting foreign objects inside a larger object, in accordance with an illustrative embodiment.

The illustrative embodiments recognize and take into account that, in antenna design, the reactive near-field is important because passive tags may be placed on surfaces that will lie inside the reactive near-field region. This effect poses problems because objects in the reactive near-field will couple to the antenna, changing its resonance, impedance, and pattern characteristics. The illustrative embodiments recognize and take into account that one way to address this issue is to keep antennas separated by sufficient distance to avoid any coupling. However, in some applications such as using passive antennas for foreign object detection, this approach is not practical due to the small size of the objects and the requirement to place the antenna in very close proximity to the object: in direct contact in most cases.

The illustrative embodiments recognize and take into account that other techniques usable to signal mixing and antenna-material isolation have not performed as desired or do not perform well. For example, one technique includes developing a separate antenna that collects energy to be provided to an active mixer, potentially at a different frequency. However, this technique undesirably increases the overall size and complexity of the device.

The illustrative embodiments also recognize and take into account that another technique includes diverting some of the collected energy from the main antennas to power an active mixer. However, this technique will lower the amount of energy going into the mixer, and thus is undesirable.

The illustrative embodiments also recognize and take into account that another technique is to separate the antenna from the material by including an acceptable dielectric of appreciable thickness between the antenna and material. However, this technique adds to the overall height of the device, which may not be desirable in certain conditions.

The illustrative embodiments also recognize and take into account that a bowtie passive antenna, particularly a nested bowtie antenna used to downshift a selected band, may be used to avoid the issues mentioned above. Thus, the illustrative embodiments provide an improved device for placing passive antennas on objects for later foreign object detection. The illustrative embodiments recognize and take into account that the nested bowtie antenna design is non-trivial, because small changes to the geometry of the antenna can result in the antenna not working at all. Exemplary failed antenna designs are presented below.

The illustrative embodiments have several advantages over known miniature passive antennas. For example, the bowtie configurations described herein provide for a reduction in size over current versions of passive tag structures. In another example, the illustrative embodiments provide for generating a mixed signal without the need for supplied power to the mixing element. Still further, the wide bandwidth of the illustrative embodiments allows for some coupling effects with metal surfaces without shifting resonance away from carrier frequencies.

The illustrative embodiments are easy to manufacture on flex materials, allowing for mounting on conformal surfaces. The illustrative embodiments also provide for a design that will return a unique radio frequency signature based on two or more transmitted signals. By receiving many transmitted signals, multiple mixing results could be used as a specific item identification more similar to a traditional radio frequency identification tag.

The illustrative embodiments may be varied. For example, the illustrative embodiments may include any number of multi-band antennas, a passive mixing component, and an applique style substrate (rigid or flexible) to comprise a passive difference-frequency tag. The unique attributes of these antenna elements create difference-frequency tags, which combat changes in antenna resonance due to material proximity via a large bandwidth and utilizes capacitance to effectively reduce the physical extents of the reactive near-field region. Combining these attributes with a passive nonlinear mixing component produces a difference-frequency tag that receives two or more incident frequencies and radiates a mixed product frequency without the need of a direct current power source.

The illustrative embodiments require no additional antenna or power network to activate a mixing component, while also providing reduced coupling between antenna and material. The geometry of the illustrative embodiments allow for easier assembly over previously discovered geometries. The illustrative embodiments also provide an additional size reduction over previous techniques. Thus, the illustrative embodiments provide for a wideband bowtie antenna including a passive mixer. The illustrative embodiments may also be characterized as a passive difference-frequency tag.

FIG. 1 is an illustration of a system for detecting foreign objects inside a larger object, in accordance with an illustrative embodiment. FIG. 1 illustrates a specific illustrative example of an application for the antennas described with respect to FIG. 3 through FIG. 8.

System 100 may be characterized as a foreign object detection system. System 100 includes two major subsystems, transmitter/detector 102 and antenna 104, which serves as a passive tag. Transmitter/detector 102 is used by an operator when it is desirable to check for or search for foreign objects inside object 106. Antennae, such as antenna 104, are adhered to tools, such as tool 108, used with respect to object 106.

Note that section 110A is an expanded view of section 110B. As can be seen, antenna 104 is much smaller.

When system 100 is activated, any tag (such as antenna 104) that is illuminated by transmitter/detector 102 with sufficient power will emit a signal that is received by the detector of transmitter/detector 102 and will effectively notify the user of the presence of object 106. The focus of the illustrative embodiments is on antenna 104, with transmitter/detector 102 being available as an off-the-shelf product. Transmitter/detector 102 may be controlled by a computer, such as data processing system 900 of FIG. 9, and may be used in a computer implemented method for detecting foreign objects or pinging any of the antennas described herein.

Figure 2:
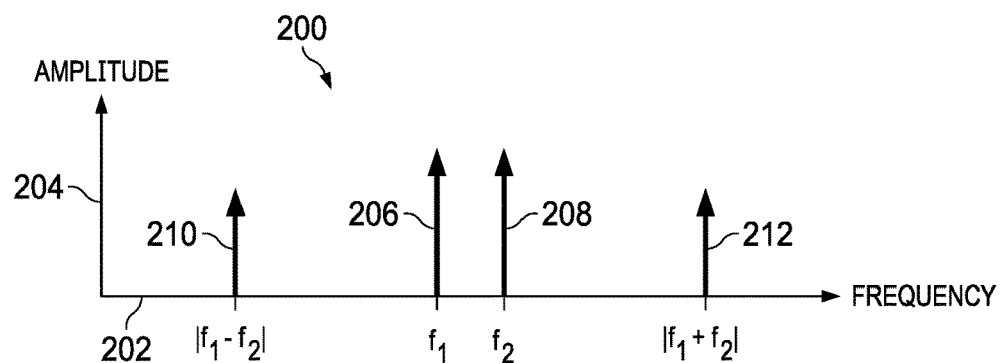
FIG. 2 is an illustration of a graph 200 of frequency 202 versus amplitude 204 and also illustrates frequency mixing, in accordance with an illustrative embodiment.

FIG. 2 is an illustration of a graph 200 of frequency 202 versus amplitude 204 and also illustrates frequency mixing, in accordance with an illustrative embodiment. The illustrative embodiments described with respect to FIG. 3 through FIG. 8 use a principle known as frequency mixing. Graph 200 of FIG. 2 is used to illustrate this principle. FIG. 2 represents a two-frequency case.

Frequency mixing occurs when two or more signals of different frequencies, such as $f_1$ 206 and $f_2$ 208, are passed through a nonlinear device, such as a diode or some other device as described further below with respect to FIG. 3 through FIG. 8. The results of mixing are sum and difference products that are located at the sum and difference of the carrier frequencies. The sum is represented by $|f_1-f_2|$ 210 and $|f_1+f_2|$ 212. Typically, the difference product is considered in signal processing due to the reduced complexity of equipment used to discern the signal.

Figure 3:
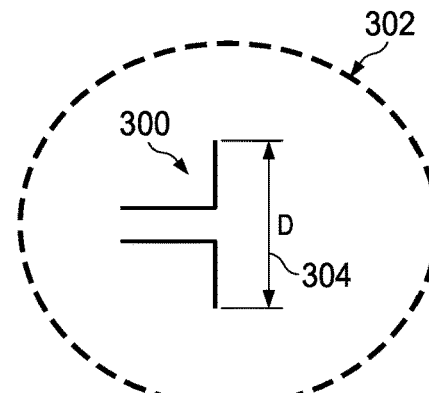
FIG. 3 is an illustration of an abstract representation of an antenna, in accordance with an illustrative embodiment.

FIG. 3 is an illustration of an abstract representation of an antenna, in accordance with an illustrative embodiment. Antenna 300 is used to describe antenna design generally.

The space surrounding an antenna is usually subdivided into three regions: the reactive near-field region, the radiating near-field region, and the far-field region. For the purpose of the illustrative embodiments, focus is placed on the reactive near-field. The reactive near-field region is defined as that portion of the near-field region immediately surrounding the antenna wherein the reactive field predominates. This region is shown at reactive near field area 302.

For most antennas the outer boundary of this region is commonly taken to exist at a distance $$R < 0.62\sqrt{\frac{D^3}{\lambda}}$$

from the antenna surface. The value of $\lambda$ is the wavelength of photons received at antenna 300 and D 304 is the largest dimension of antenna 300. An example of a reactive near-field boundary is shown in FIG. 3.

Figure 4:
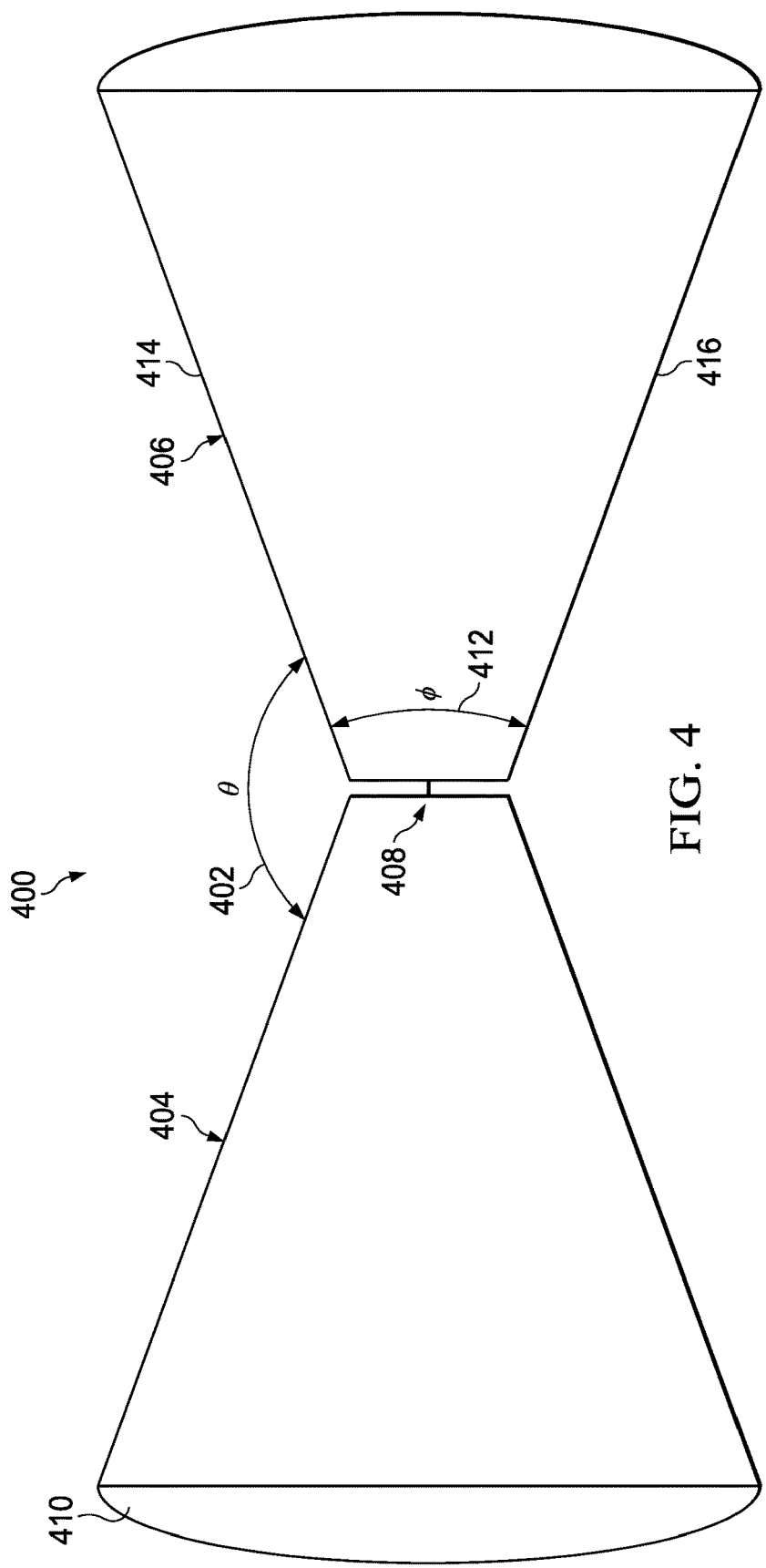
FIG. 4 is an illustration of an antenna with two dipole legs, in accordance with an illustrative embodiment.

FIG. 4 is an illustration of an antenna with two dipole legs, in accordance with an illustrative embodiment. Antenna 400 is an example of an antenna that may be used as part of foreign object detection in the illustrative embodiments. Antenna 400 is a variation of antenna 300 of FIG. 3.

The illustrative embodiments focus on the reactive near-field because the passive tags may be placed on surfaces that will lie inside the reactive near-field region. This fact poses difficulties because objects in the reactive near-field will couple to antenna 400, changing is resonance, impedance, and pattern characteristics. A standard practice is to keep antennas separated by sufficient distance to avoid any coupling, but as previously stated this approach is not practical for the desired applications.

Thus, the illustrative embodiments use a bowtie antenna design, shown generally by antenna 400 that has a large enough bandwidth such that it does not suffer a large deviation in resonance and pattern when placed near various objects. Antenna 400 is described as "planar" because it is built as a thin, flat object on a substrate that may be either rigid or flexible, as desired. The planar wideband bowtie antenna is primarily a function of angle θ 402 between the two dipole legs, leg 404 and leg 406, as shown in FIG. 3. Therefore, the fractional bandwidth of antenna 400 is increased by decreasing angle theta 402 between the two legs, which consecutively increases the amount of conductive material.

Leg 404 and leg 406 may each be described as a frustoconical shape. The term "frustoconical shape" is used, because the two legs are not actually frustocones. Rather, they are relatively flat, thin objects with cropped apexes and rounded bases, such as apex 408 and base 410. In other words, each leg of antenna 400 has the shape of a slice of a frustocone from the apex through to the base.

Another relevant angle for antenna 400 is angle φ 412, which is the angle subtended by chords defining the outer boundary of the sides of the frustoconical shape (such as chord 414 and chord 416). Angle φ 412 may be termed the flare angle. Laboratory testing has shown that at an angle θ 140°, with a flare angle of φ≈20°, the planar wideband bowtie antenna has a fractional bandwidth greater than 30%. However, other angles are possible, and thus this specific example does not necessarily limit the claimed inventions.

Figure 5:
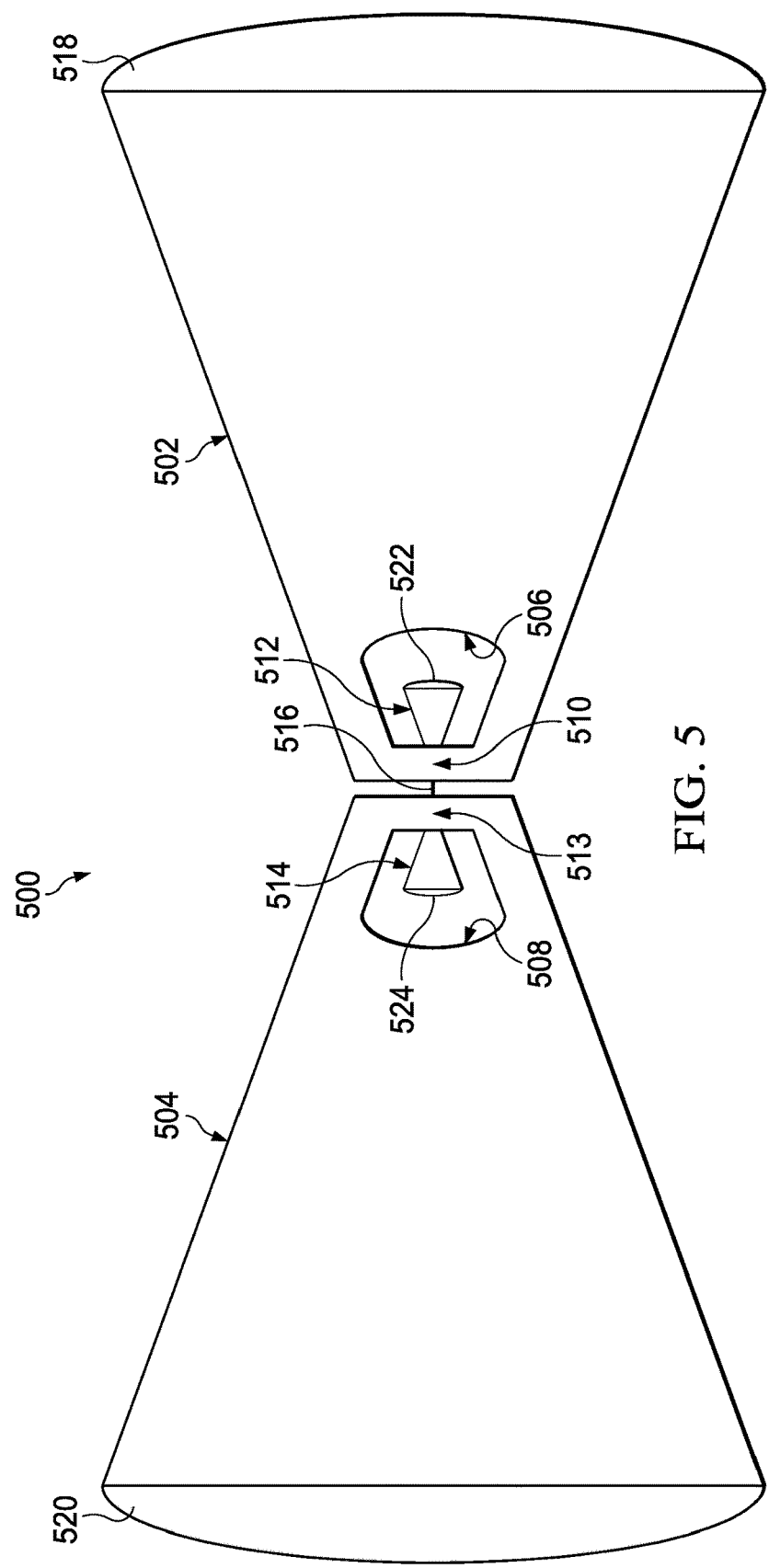
FIG. 5 is an illustration of a nested bowtie antenna, in accordance with an illustrative embodiment.

FIG. 5 is an illustration of a nested bowtie antenna, in accordance with an illustrative embodiment. Antenna 500 is a variation of antenna 400 of FIG. 4 and antenna 300 of FIG. 3. Antenna 500 may be referred to as a nested bowtie antenna because each of the larger legs of antenna 500 has a cutout section with a smaller, similarly shaped leg projecting into the space, as described further below.

In particular, antenna 500 includes major leg 502 and major leg 504. Major leg 502 includes cutout 506 and major leg 504 includes cutout 508. At apex 510 of major leg 502 is minor leg 512, which extends into cutout 506. At apex 513 of major leg 504 is minor leg 514, which extends into cutout 508. Both legs have a frustoconical shape.

Diode 516 connects both major legs together, as well as both minor legs together. Diode 516 acts as a mixer of first radio frequencies sensed by the major legs and second radio frequencies sensed by the minor legs. Diode 516 may also be referred-to as a "diode assembly" if diode 516 includes additional material to connect diode 516 to the legs, or includes other components useful for mixing radio frequency wavelengths, as described below.

Each of the legs in FIG. 5 have rounded end caps, including end cap 518 and end cap 520 of the major legs, as well as end cap 522 and end cap 524 of the minor legs. Each apex, apex 510 and apex 513, is physically separated from each other, though again diode 516 connects the two legs together.

The terms "major" and "minor" do not imply structural limitations on antenna 500, other than that a "major" leg is physically larger than a "minor" leg. Note that a corresponding major and minor leg may be formed from a single piece of material. Thus, for example, major leg 502 and minor leg 512 are formed from a single piece of material. However, in other illustrative embodiments, the major and minor legs may be made from the same or different materials which are then later connected to each other.

Attention is now turned to using diode 516 as a mixer in antenna 500. A diode is a nonlinear device that can be used to create an unbalanced mixer. The current I through an ideal diode is given by the Shockley equation as $$I = I_S\left[e^{\frac{qv_D}{nkT}} - 1\right]$$

where k is Boltzmann's constant, q is the magnitude of the electrical charge of an electron, T is the temperature, n is the emission coefficient, $I_S$ is the saturation current, and $v_D$ is the diode voltage. By expanding and using a small argument approximation for two input voltages $v_1+v_2$ that is applied to the diode, the output voltage can be written as $$v_0 = (v_1+v_2) + \tfrac{1}{2}(v_1+v_2)^2.$$

The first term is just the sum of the original voltages and the square term can be rewritten as $$(v_1+v_2)^2 = v_1^2 + 2v_1v_2 + v_2^2,$$

where $v_2$ and $v_2$ are higher power sum terms, which are assumed to be negligible for small signals. To demonstrate signal mixing one may define the two input voltages as sinusoids with different frequencies as:

$$v_1 = \sin(at)$$

$$v_2 = \sin(bt)$$

and rewrite the output voltage as:

$$v_0 = (\sin(at)+\sin(bt)) + \tfrac{1}{2}(\sin(at)^2 + 2\sin(at)\sin(bt) + \sin(bt)^2).$$

Ignoring the higher order terms except for the product term and using the product to sum identity, the output voltage can be expressed as:

$$v_0 = \cos((a-b)t) - \cos((a+b)t);$$

showing the mixed frequencies created by the mixer.

The illustrative embodiments use the resonant dimensions of two W-band frequencies and a single resonant dimension of an X-band frequency. The lower band does not need to be X-band. For example, Ku band, K band, or Ka band resonators may be used for size reduction. There is also no requirement for use of the W-band as the upper band. Any band that can provide the desired lower band mixing products is possible. Thus, the examples provided in FIG. 5 do not necessarily limit the claimed inventions or the other illustrative embodiments described herein.

The geometry of a bowtie antenna with a rounded end-cap causes the antenna to be more capacitive than a traditional dipole antenna. This capacitive aspect of the antenna causes design changes to the expected resonant dimension of the antenna. For the case of a W-band rounded end-cap antenna, such as antenna 500, this capacitance becomes large compared to a traditional half wavelength dipole antenna or as defined by a frequency shift of 90 gigahertz or greater, as the aspect ratio of the end cap compared to the lateral dimension becomes closer to unity. As an antenna becomes more and more capacitive, the resonance frequency shifts to lower frequencies.

Figure 6:
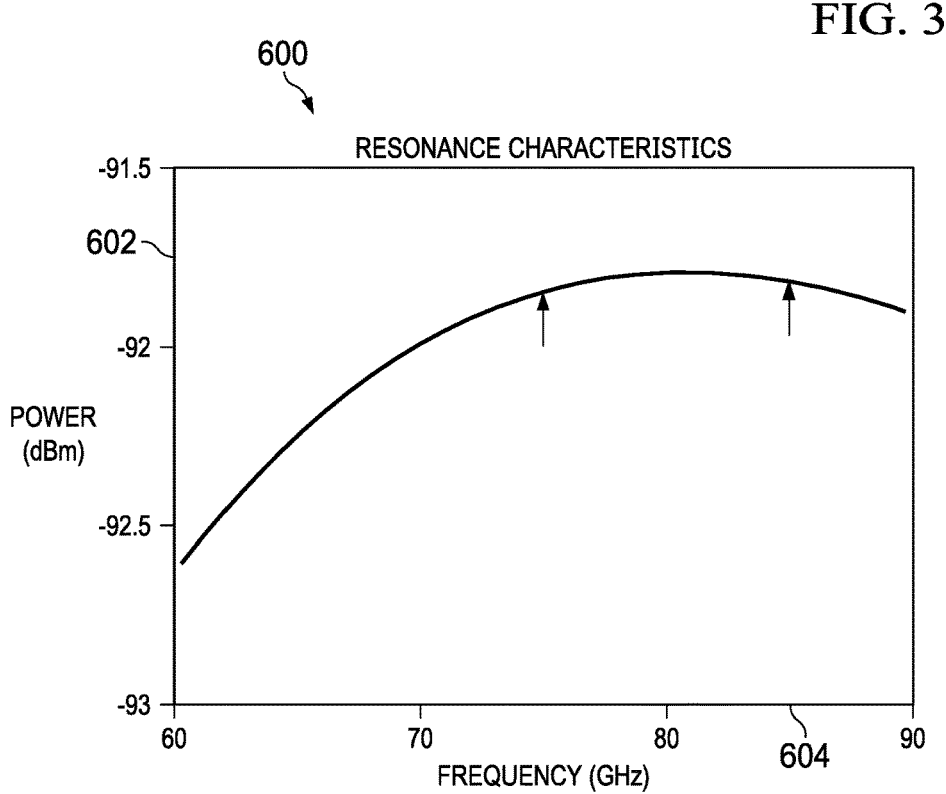
FIG. 6 is an illustration of a graph of resonance characteristics of a bowtie antenna, in accordance with an illustrative embodiment.
Figure 7:
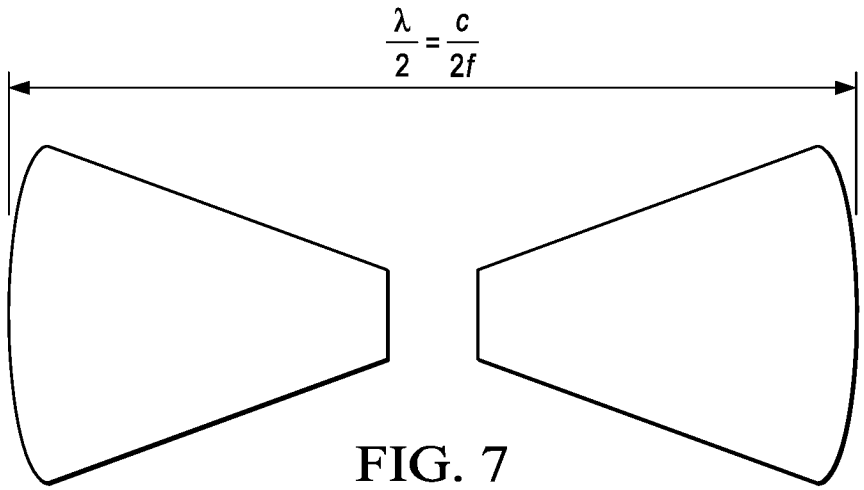
FIG. 7 is an illustration of a property of a bowtie antenna, in accordance with an illustrative embodiment.

FIG. 6 and FIG. 7 should be considered together. FIG. 6 is an illustration of a graph of resonance characteristics of a bowtie antenna, in accordance with an illustrative embodiment. FIG. 7 is an illustration of a property of a bowtie antenna, in accordance with an illustrative embodiment. FIG. 7 shows the mathematical relationship of wavelength, lamda, to frequency, f, with "c" being a constant; namely, the speed of light.

Graph 600 is a graph of power (Y axis 602) versus frequency (X axis 604). Graph 600 may be applicable to antenna 500 of FIG. 5, for example.

The illustrative embodiments take advantage of a resonance shift in radio frequency response by creating an antenna that is resonant near one frequency, such as but not limited to, 180 GHz, but is highly capacitive such that its response frequency shifts down to the desired W-Band frequency. This effect is shown in FIG. 6.

One advantage of this effect is the reduction of the reactive near field dimension that causes coupling with outside materials. Decreasing the size of an antenna in this way dramatically reduces its bandwidth, but the antenna was originally designed with bandwidth such that even with this reduction it still collects enough energy at the desired resonance to function properly. In other words, the illustrative embodiments may be thought of as overcoming what is normally a trade-off in antenna design.

FIG. 8 is an illustration of another nested bowtie antenna, in accordance with an illustrative embodiment. FIG. 8 is an alternative illustrative embodiment relative to FIG. 5. However, otherwise antenna 800 and antenna 500 of FIG. 5 are similar.

One difference between antenna 800 and antenna 500 is that rectangular cutout 802 has been placed between first segment 804 and second segment 806 of antenna 800. While rectangular cutout 802 is rectangular in this example, the shape of this cutout may be varied. Whatever the shape of rectangular cutout 802, diode assembly 808 is placed between first segment 804 and second segment 806 inside rectangular cutout 802.

First segment 804 and second segment 806 are both frustoconical in shape, with rounded end cap 810 and rounded endcap 812, respectively. First segment 804 and second segment 806 may serve as an X-band radio antenna, but other bands may be selected by varying the size of the segments. Antenna 800 also includes first cutout 814 and second cutout 816.

Figure 9:
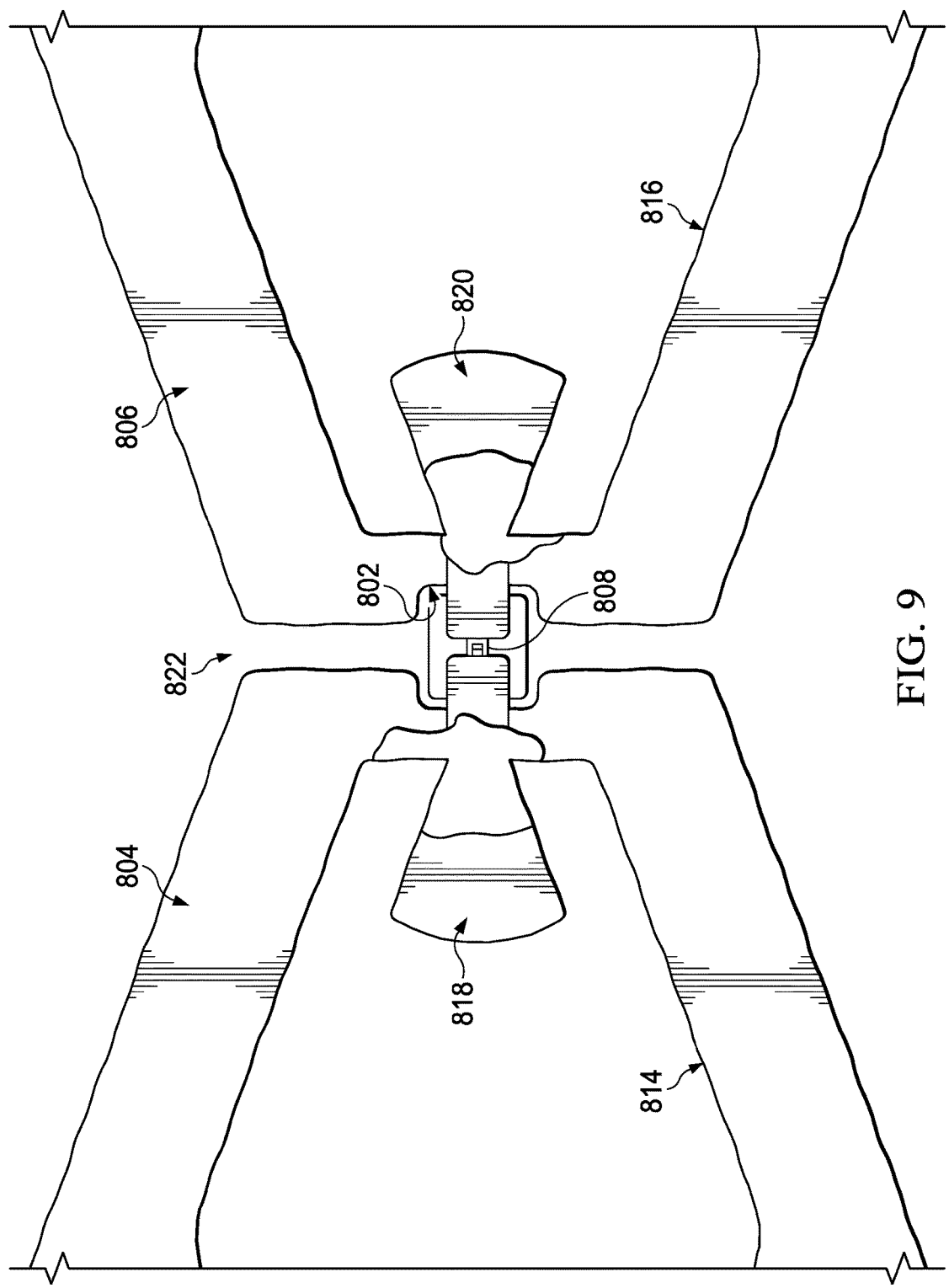
FIG. 9 is an illustration of a close-up view of the inner portion of the nested bowtie antenna shown in FIG. 8, in accordance with an illustrative embodiment.

Antenna 800 may also include third segment 818 and fourth segment 820. Third segment 818 extends into first cutout 814 and has a frustoconical shape. Third segment 818 may be geometrically similar to first segment 804. Similarly, fourth segment 820 extends into second cutout 816 and has a frustoconical shape; and fourth segment 820 may be geometrically similar to second segment 806. Third segment 818 and fourth segment 820 may be sized and dimensioned to serve as a W-band radio antenna (as shown in FIG. 9), though again the band selected may be varied by varying the size of these segments.

Note that, as shown, first segment 804, second segment 806, third segment 818, and fourth segment 820 may all be formed from a single sheet of material. Alternatively, segments on a same side of the bowtie shape of antenna 800 may be formed from the same piece of material, and then the two sides of the bowtie joined by diode assembly 808. Other manufacturing techniques are possible, such as additive, subtractive, molding techniques, and others.

As can be seen in FIG. 8, gap 822 may be present between first segment 804 and second segment 806. Nevertheless, these two segments, as well as third segment 818 and fourth segment 820, are conductively joined by diode assembly 808.

Cutout 814 and cutout 816 are sized and dimensioned to minimize the effects of the metal surrounding them. Controlling the shape of the hole around the W-Band antennas determines the beam shape of the W-Band frequencies. The metal that remains in the reactive near field causes shifts in resonance, but the bandwidth of the bowtie allows the antenna to still absorb sufficient energy with enough efficiency to function.

These cutouts may be, in one example, 0.0002 square meters, though other sizes may be used. At this size, the near field condition is satisfied, and coupling is minimized but not entirely eliminated.

The effects of the proximity from the X-Band antenna on the W-Band antenna are more apparent in the antenna's pattern, shown below in FIG. 10 through FIG. 12. By varying the geometry of the cutouts, a desired pattern may be affected. The goal of the design of the W-band (shorter wavelength) antenna is to create a main lobe that is in the direction of one of the main lobes of the X-band (longer wavelength) antenna.

FIG. 9 is an illustration of a close-up view of the inner portion of the nested bowtie antenna shown in FIG. 8, in accordance with an illustrative embodiment. Because FIG. 9 is a close-up view of the structures shown in FIG. 8, FIG. 9 uses the same reference numerals and uses the same descriptions as those presented above with respect to FIG. 8.

Figure 10:
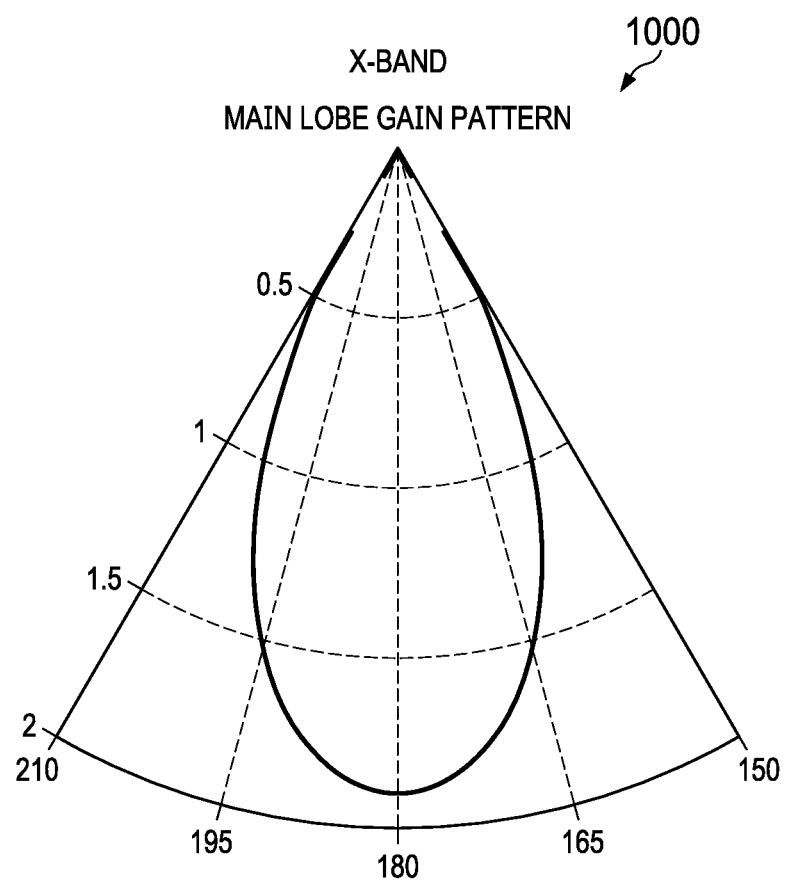
FIG. 10 is an illustration of a radio frequency pattern emitted by an X-band antenna, in accordance with an illustrative embodiment.
Figure 11:
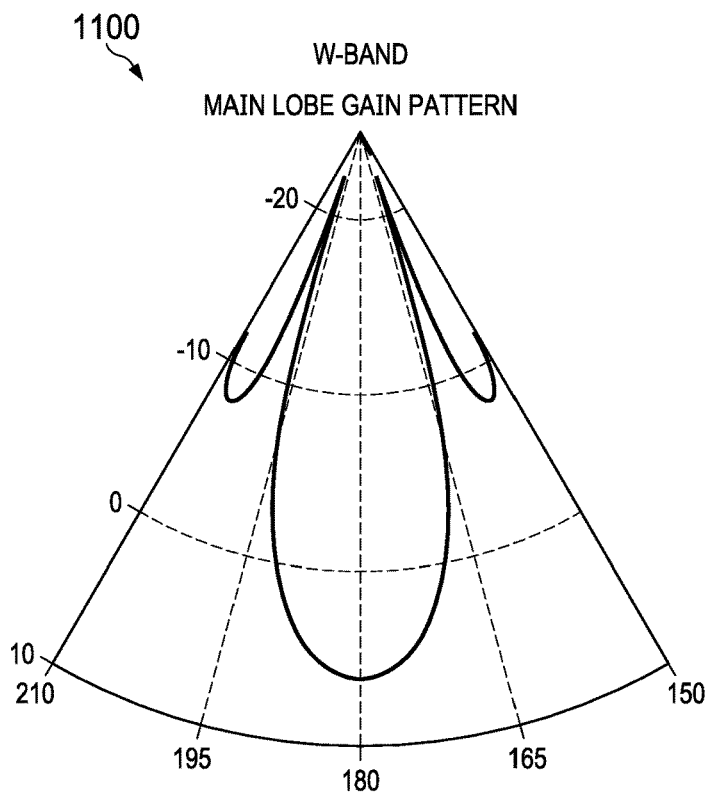
FIG. 11 is an illustration of a radio frequency pattern emitted by a W-band antenna, in accordance with an illustrative embodiment.
Figure 12:
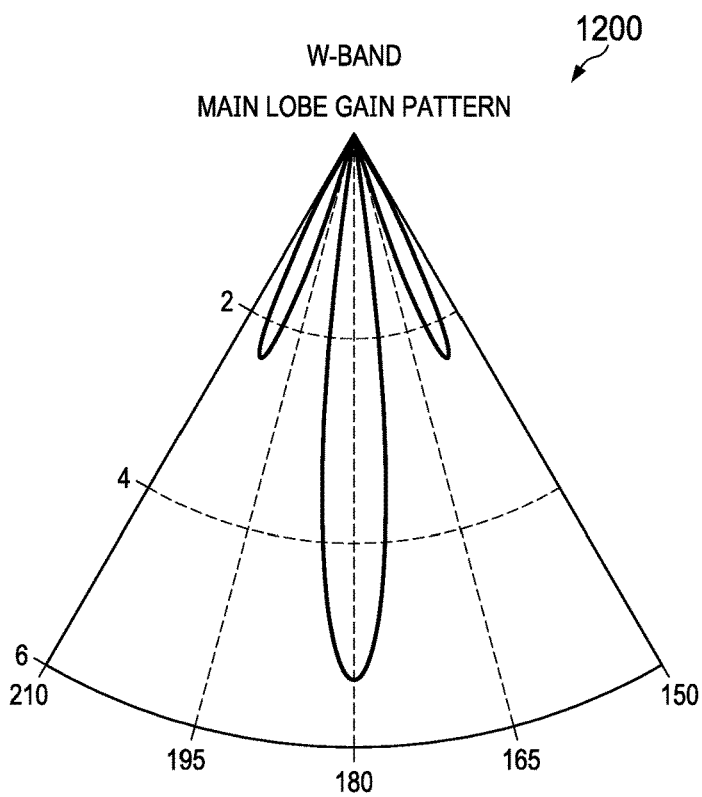
FIG. 12 is an illustration of a radio frequency pattern emitted by a second W-band antenna, in accordance with an illustrative embodiment.

FIG. 10 through FIG. 12 should be considered together. FIG. 10 is an illustration of a radio frequency pattern emitted by an X-band antenna, in accordance with an illustrative embodiment. FIG. 11 illustrates a radio frequency pattern emitted by a W-band antenna, in accordance with an illustrative embodiment. FIG. 12 illustrates a radio frequency pattern emitted by a second W-band antenna, in accordance with an illustrative embodiment.

As used herein, the term "pattern" refers to the distribution of radio frequency energy emitted from an antenna in response to stimulation from an outside emitter. An example of such an emitter is transmitter/detector 102 in FIG. 1. In each of FIG. 10 through FIG. 12, the number along the edges of the pie-shaped graph represents the relative strength of the signal. The number along the curved end of the pie-shaped graph is the angle from the central axis of the antenna.

Pattern 1000 of FIG. 10 is an example of a lobe pattern that may be emitted from a bowtie X-band antenna, such as that shown in FIG. 8 and FIG. 9. Pattern 1100 of FIG. 11 is an example of a lobe pattern that may be emitted from a bowtie W-band antenna, such as that shown in FIG. 8 and FIG. 9. Pattern 1200 of FIG. 12 is an example of a lobe pattern that may be emitted from a bowtie W-band antenna, such as those shown in FIG. 8 and FIG. 9.

Thus, FIG. 10 through FIG. 12 are illustrations of the patterns of the X-Band and the W-Band antennas at their frequencies of operation. With all antennas having a main lobe in the same direction, the assembly is capable of collecting and then radiating energy in the same direction.

Figure 13:
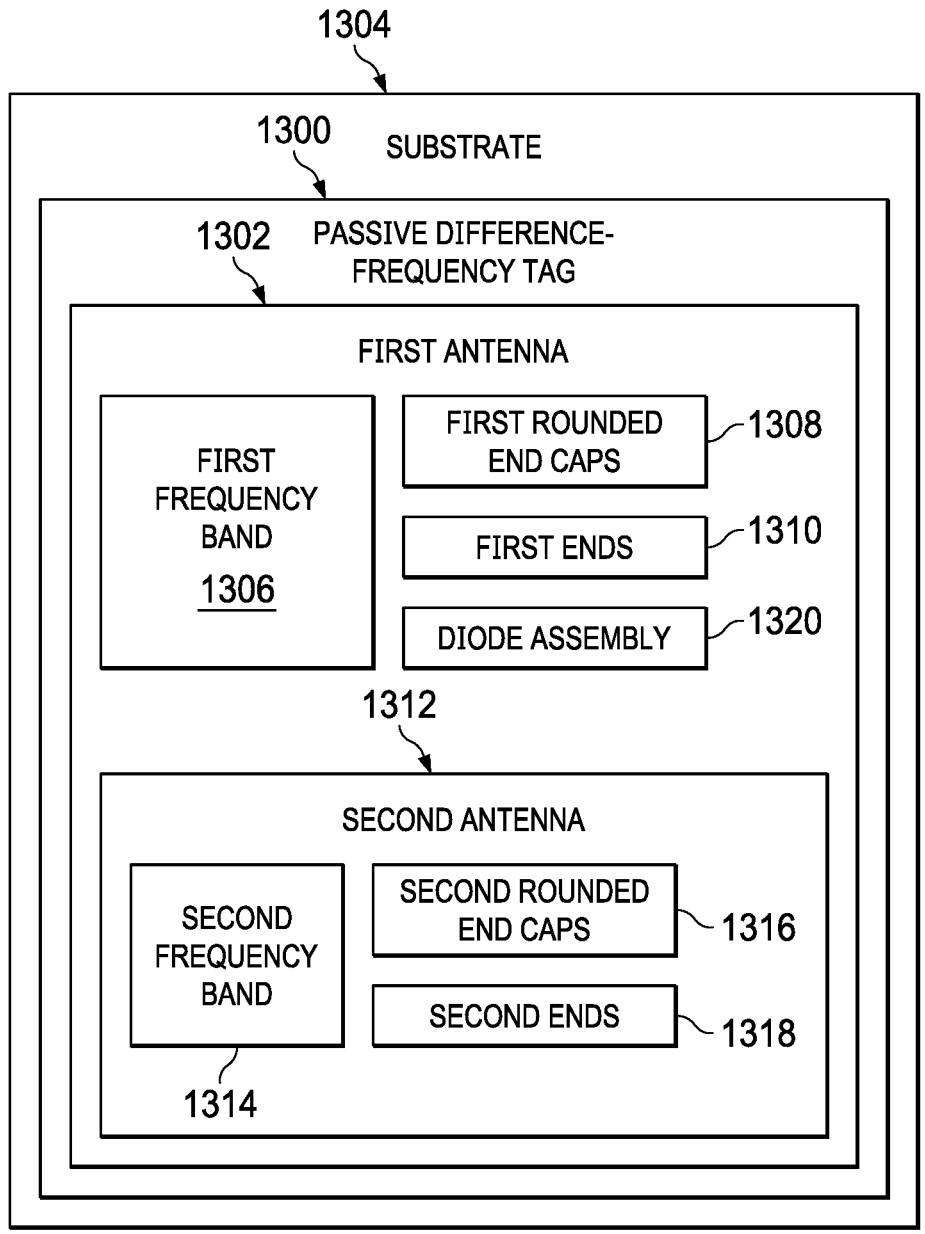
FIG. 13 is an illustration of a block diagram of a passive difference-frequency tag, in accordance with an illustrative embodiment.

FIG. 13 is an illustration of a passive difference-frequency tag, in accordance with an illustrative embodiment. Passive difference-frequency tag 1300 may be a variation of the bowtie antennas shown in FIG. 4 through FIG. 9.

Passive difference-frequency tag 1300 includes first antenna 1302 on substrate 1304. First antenna 1302 has first antenna frequency band 1306. First antenna 1302 has a first shape of a first bowtie with first rounded end caps 1308 and first ends 1310 opposed to each other.

Passive difference-frequency tag 1300 also includes second antenna 1312 on substrate 1304 inside first antenna 1302, second antenna 1312 has second frequency band 1314 higher than first antenna frequency band 1306. Second antenna 1312 has a second shape of a second bowtie with second rounded end caps 1316 and second ends 1318 opposed to each other. A combination of first antenna 1302 and second antenna 1312 forms a plurality of multi-band antennas with a shared axis of symmetry.

Passive difference-frequency tag 1300 also includes diode assembly 1320 on substrate 1304. Diode assembly is connected to first ends 1310 of first antenna 1302 and to second ends 1318 of second antenna 1312.

Passive difference-frequency tag 1300 may be varied. For example, diode assembly 1320 may be configured to act as a passive mixing component. The passive mixing component is configured to produce a unique radio frequency return signature based on a geometry of diode assembly 1320, first antenna 1302, and second antenna 1312.

In another illustrative embodiment, first antenna 1302 may be configured to be resonant in an X-band frequency. In this example, second antenna 1312 may be configured to be resonant in two W-band frequencies.

In still a different illustrative embodiment, first antenna 1302 may be defined by an angle, theta, subtended between chords extending from bases of the first shape. Theta may be at least one hundred and forty degrees.

In yet another illustrative embodiment, first antenna 1302, second antenna 1312, and diode assembly 1320 together have a resonant frequency that is down-shifted from about one hundred and eighty gigahertz to between about seventy and about ninety gigahertz. Still other variations are possible. Thus, the illustrative embodiments described with respect to FIG. 13 do not necessarily limit the claimed inventions.

Figure 14:
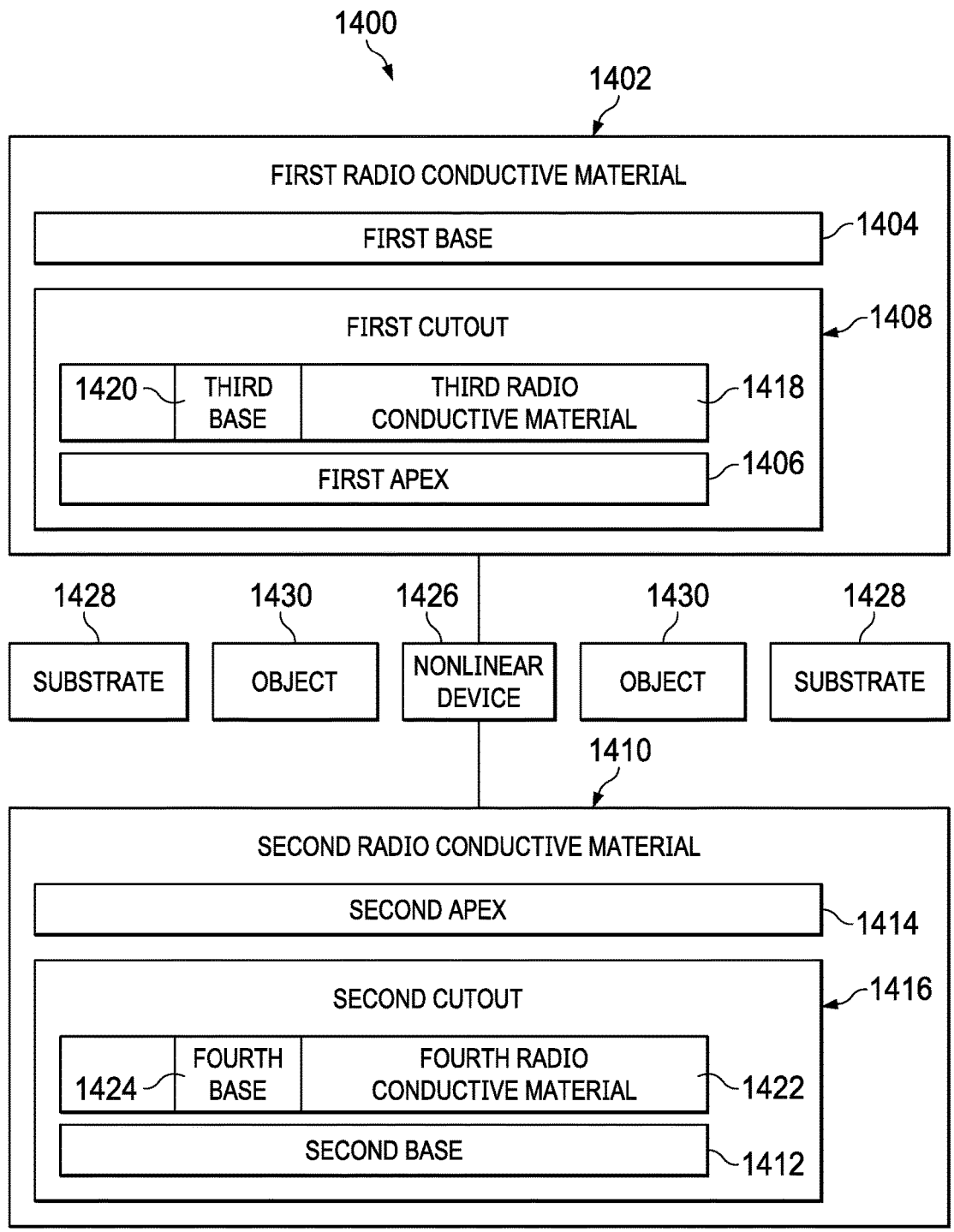
FIG. 14 is an illustration of a block diagram of a passive radio frequency antenna, in accordance with an illustrative embodiment.

FIG. 14 is an illustration of a passive radio frequency antenna, in accordance with an illustrative embodiment. Passive radio frequency antenna 1400 may be a variation of the bowtie antennas shown in FIG. 4 through FIG. 9, or in FIG. 13.

Passive radio frequency antenna 1400 includes first radio conductive material 1402 having a first frustoconical shape. First base 1404 of first frustoconical shape is rounded outwardly relative to first apex 1406 of the first frustoconical shape. First cutout 1408 is removed from the first frustoconical shape nearer to first apex 1406 than to first base 1404.

Passive radio frequency antenna 1400 also includes second radio conductive material 1410 having a second frustoconical shape. Second base 1412 of the second frustoconical shape is rounded outwardly relative to second apex 1414 of the second frustoconical shape. Second cutout 1416 is removed from the second frustoconical shape closest to second apex 1414 than to second base 1412. First apex 1406 is proximate to but separated from second apex 1414 such that first radio conductive material 1402 and second radio conductive material 1410 appear to have a bowtie shape.

Passive radio frequency antenna 1400 also includes third radio conductive material 1418 having a third frustoconical shape extending from first apex 1406 into first cutout 1408 towards first base 1404. Third base 1420 is rounded outwardly relative to first apex 1406.

Passive radio frequency antenna 1400 also includes fourth radio conductive material 1422 having a fourth frustoconical shape extending from second apex 1414 into second cutout 1416 towards second base 1412. Passive radio frequency antenna 1400 also includes fourth base 1424 rounded outwardly relative to second apex 1414.

Passive radio frequency antenna 1400 also includes non-linear device 1426 connecting first radio conductive material 1402 and second radio conductive material 1410 between first base 1404 and second base 1412, and also connecting third radio conductive material 1418 and fourth radio conductive material 1422 between third base 1420 and fourth base 1424.

Passive radio frequency antenna 1400 may be varied. For example, first cutout 1408 may have a first dimension of less than 0.0002 square meters and second cutout 1416 may have a second dimension of less than 0.0002 square meters.

In another illustrative embodiment, first cutout 1408 and second cutout 1416 may have geometries which create a single X-band main lobe gain pattern. Continuing this example, first cutout 1408 and second cutout 1416 may have geometries which create a W-band main lobe gain pattern with two side lobe patterns. Additionally, the geometries may be further configured such that the two side lobe patterns are substantially separated from the main lobe gain pattern.

In yet another illustrative embodiment, first cutout 1408 may have a first geometry that creates a first main lobe gain pattern extending from third radio conductive material 1418 towards first radio conductive material 1402. In this case, second cutout 1416 may have a second geometry that creates a second main lobe gain pattern extending from fourth radio conductive material 1422 towards second radio conductive material 1410. In this manner, radio energy is collected and radiated in the same directions.

In still another illustrative embodiment, an arc, theta, is subtended by similar chords of the first frustoconical shape and the second frustoconical shape, and wherein the non-linear device is a diode. In this case, theta may be about one hundred and forty degrees. Additionally, an angle, phi, may be subtended by first sides of the first frustoconical shape and also by second sides of the second frustoconical shape. Phi may be about twenty degrees.

In yet another illustrative embodiment, passive radio frequency antenna 1400 may be planar having a factional bandwidth greater than thirty percent.

In still another illustrative embodiment, passive radio frequency antenna 1400 may be disposed on substrate 1428.

Substrate 1428 may be flexible such that passive radio frequency antenna 1400 is placeable on curved surfaces.

In still another illustrative embodiment, substrate 1428 may be attached to object 1430. In this manner, object 1430 can be uniquely identified by transmitting a radio pulse towards passive radio frequency antenna 1400 and reading a response from passive radio frequency antenna 1400. Still other variations are possible. Thus, the illustrative embodiments described with respect to FIG. 14 do not necessarily limit the claimed inventions.

Figure 15:
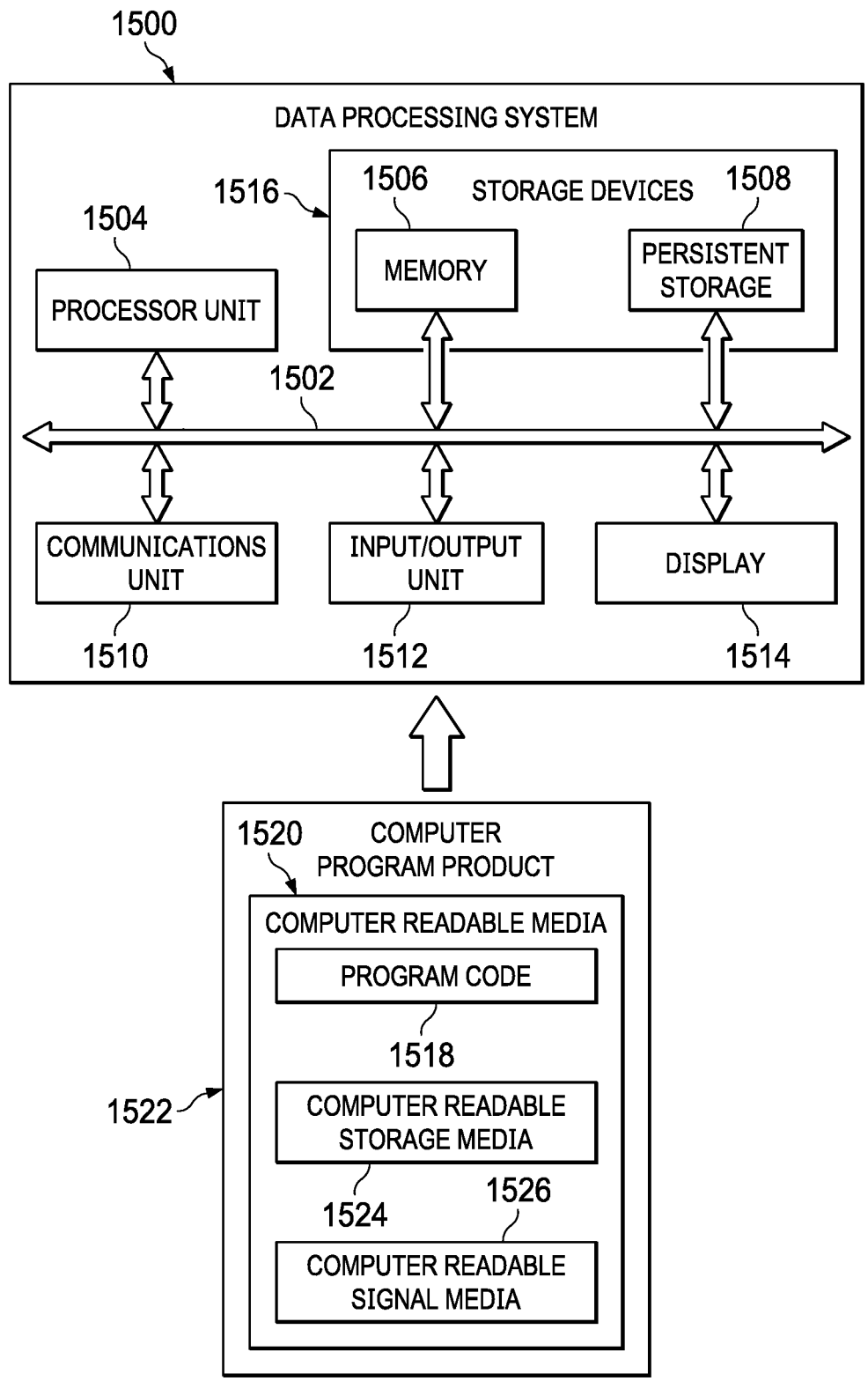
FIG. 15 is an illustration of a block diagram of a data processing system, in accordance with an illustrative embodiment.

Turning now to FIG. 15, an illustration of a data processing system is depicted in accordance with an illustrative embodiment. Data processing system 1500 in FIG. 15 is an example of a data processing system that may be used to implement any data processing required to process signals from any of the passive antenna described with respect to FIG. 3 through FIG. 9, or with respect to FIG. 13 and FIG. 14. In this illustrative example, data processing system 1500 includes communications fabric 1502, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. This software may be an associative memory, content addressable memory, or software for implementing the processes described elsewhere herein. Thus, for example, software loaded into memory 1506 may be software for executing pattern 1100 of FIG. 11, pattern 1200 of FIG. 12, or for implementing the six steps described above with respect to FIG. 4 through FIG. 8. Processor unit 1504 may be a number of processors, a multi-processor core, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. Display 1514 provides a mechanism to display information to a user.

Instructions for the operating system, applications, and/or programs may be located in storage devices 1516, which are in communication with processor unit 1504 through communications fabric 1502. In these illustrative examples, the instructions are in a functional form on persistent storage 1508. These instructions may be loaded into memory 1506 for execution by processor unit 1504. The processes of the different embodiments may be performed by processor unit 1504 using computer implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526. Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code 1518 to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1518 may be omitted because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

As another example, a storage device in data processing system 1500 is any hardware apparatus that may store data. Memory 1506, persistent storage 1508, and computer readable media 1520 are examples of storage devices in a tangible form.

In another example, a bus system may be used to implement communications fabric 1502 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1506, or a cache, such as found in an interface and memory controller hub that may be present in communications fabric 1502.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or computer usable program code such that when the computer readable or computer usable program code is executed on a computer, the execution of this computer readable or computer usable program code causes the computer to transmit another computer readable or computer usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A passive difference-frequency tag comprising:
a first antenna on a substrate, the first antenna having a first frequency band, the first antenna having a first shape of a first bowtie with first rounded end caps and first ends opposed to each other;
a second antenna on the substrate inside the first antenna, the second antenna having a second frequency band higher than the first antenna frequency band, the second antenna having a second shape of a second bowtie with second rounded end caps and second ends opposed to each other, and wherein a combination of the first antenna and the second antenna forms a plurality of multi-band antennas with a shared axis of symmetry; and
a diode assembly on the substrate, and connected to the first ends of the first antenna and to the second ends of the second antenna.

2. The passive difference-frequency tag of claim 1, wherein the diode assembly is configured to act as a passive mixing component, wherein the passive mixing component is configured to produce a unique radio frequency return signature based on a geometry of the diode assembly, the first antenna, and the second antenna.

3. The passive difference-frequency tag of claim 1, wherein the first antenna is configured to be resonant in an X-band frequency.

4. The passive difference-frequency tag of claim 3, wherein the second antenna is configured to be resonant in two W-band frequencies.

5. The passive difference-frequency tag of claim 1, wherein the first antenna is defined by an angle, theta, subtended between chords extending from bases of the first shape, and wherein theta is at least one hundred and forty degrees.

6. The passive difference-frequency tag of claim 1, wherein the first antenna, the second antenna, and the diode assembly together have a resonant frequency that is downshifted from about one hundred and eighty gigahertz to between about seventy and about ninety gigahertz.

7. A passive radio frequency antenna comprising:
a first radio conductive material having a first frustoconical shape, wherein a first base of the first frustoconical shape is rounded outwardly relative to a first apex of the first frustoconical shape, and wherein a first cutout is removed from the first frustoconical shape nearer to the first apex than to the first base;
a second radio conductive material having a second frustoconical shape, wherein a second base of the second frustoconical shape is rounded outwardly relative to a second apex of the second frustoconical shape, wherein a second cutout is removed from the second frustoconical shape nearer to the second apex than to the second base, and wherein the first apex is proximate to but separated from the second apex such that the first radio conductive material and the second radio conductive material appear to have a bowtie shape;
a third radio conductive material having a third frustoconical shape extending from the first apex into the first cutout towards the first base, the third base being rounded outwardly relative to the first apex;
a fourth radio conductive material having a fourth frustoconical shape extending from the second apex into the second cutout towards the second base, the fourth base being rounded outwardly relative to the second apex; and
a nonlinear device connecting the first radio conductive material and the second radio conductive material between the first base and the second base, and also connecting the third radio conductive material and the fourth radio conductive material between the third base and the fourth base.

8. The passive radio frequency antenna of claim 7, wherein the first cutout has a first dimension of less than 0.0002 square meters and wherein the second cutout has a second dimension of less than 0.0002 square meters.

9. The passive radio frequency antenna of claim 7, wherein the first cutout and the second cutout have geometries which create a single X-band main lobe gain pattern.

10. The passive radio frequency antenna of claim 7, wherein the first cutout and the second cutout have geometries which create a W-band main lobe gain pattern with two side lobe patterns.

11. The passive radio frequency antenna of claim 10, wherein the geometries are further configured such that the two side lobe patterns are substantially separated from the main lobe gain pattern.

12. The passive radio frequency antenna of claim 7, wherein the first cutout has a first geometry that creates a first main lobe gain pattern extending from the third radio conductive material towards the first radio conductive material, and wherein the second cutout has a second geometry that creates a second main lobe gain pattern extending from the fourth radio conductive material towards the second radio conductive material, whereby radio energy is collected and radiated in the same directions.

13. The passive radio frequency antenna of claim 7, wherein an arc, theta, is subtended by similar chords of the first frustoconical shape and the second frustoconical shape, and wherein the nonlinear device comprises a diode.

14. The passive radio frequency antenna of claim 13, wherein theta is about one hundred and forty degrees.

15. The passive radio frequency antenna of claim 13 wherein an angle, phi, is subtended by first sides of the first frustoconical shape and also by second sides of the second frustoconical shape.

16. The passive radio frequency antenna of claim 15, wherein phi is about twenty degrees.

17. The passive radio frequency antenna of claim 16, wherein the passive radio frequency antenna is planar having a factional bandwidth greater than thirty percent.

18. The passive radio frequency antenna of claim 7, wherein the passive radio frequency antenna is disposed on a substrate.

19. The passive radio frequency antenna of claim 18, wherein the substrate is flexible such that the passive radio frequency antenna is placeable on curved surfaces.

20. The passive radio frequency antenna of claim 19, wherein the substrate is attached to an object, whereby the object can be uniquely identified by transmitting a radio pulse towards the passive radio frequency antenna and reading a response from the passive radio frequency antenna.

* * * * *